(No Model.)
2 Sheets—Sheet 1.

J. B. WILKINS.
AGRICULTURAL MACHINE.

No. 484,690.
Patented Oct. 18, 1892.

Witnesses;

Inventor,
John B. Wilkins,
By his Attorneys, (No Model.) 2 Sheets—Sheet 2.

J. B. WILKINS.
AGRICULTURAL MACHINE.

No. 484,690. Patented Oct. 18, 1892.

Witnesses:

Inventor,
John B. Wilkins,
By his Attorneys,
C. A. Snow & Co.

UNITED STATES PATENT OFFICE.

JOHN BIRD WILKINS, OF FARMINGTON, MISSOURI, ASSIGNOR OF ONE-HALF TO THOMAS W. STRINGER, OF VICKSBURG, MISSISSIPPI.

AGRICULTURAL MACHINE.

SPECIFICATION forming part of Letters Patent No. 484,690, dated October 18, 1892.

Application filed April 16, 1892. Serial No. 429,395. (No model.)

*To all whom it may concern:*

Be it known that I, JOHN BIRD WILKINS, a citizen of the United States, residing at Farmington, in the county of St. François and State of Missouri, have invented a new and useful Agricultural Machine, of which the following is a specification.

My invention relates to agricultural machines; and the objects in view are to provide a machine adapted to serve as a cotton planter, scraper, and cultivator or chopper, and as a road-cart, and also adapted as a cotton and cornstalk cutter.

Other objects and advantages of the invention, together with the novel features thereof, will be hereinafter described, and particularly pointed out in the claims.

Figure 1:
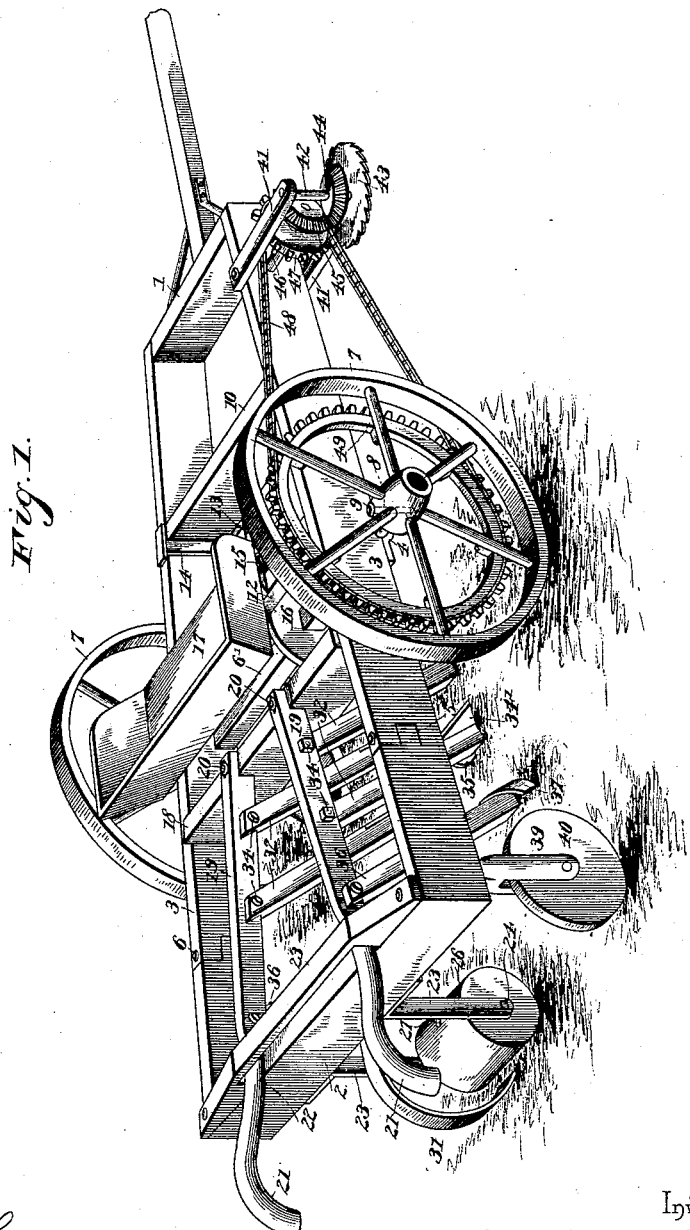
Figure 2:
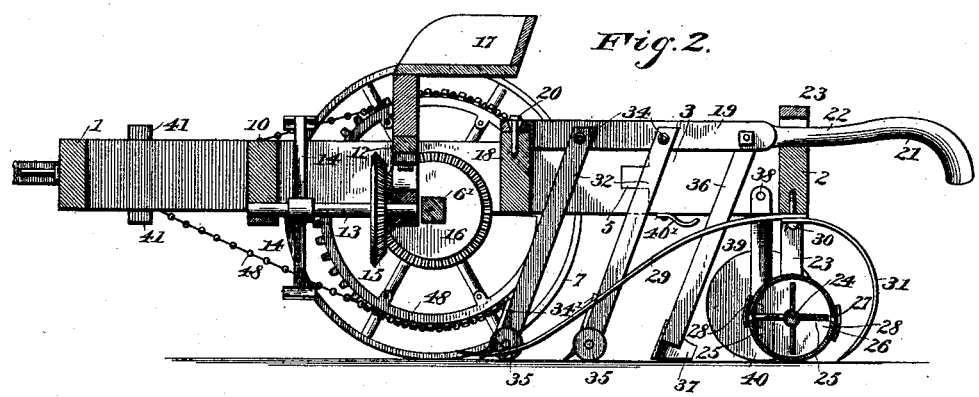
Figure 3:
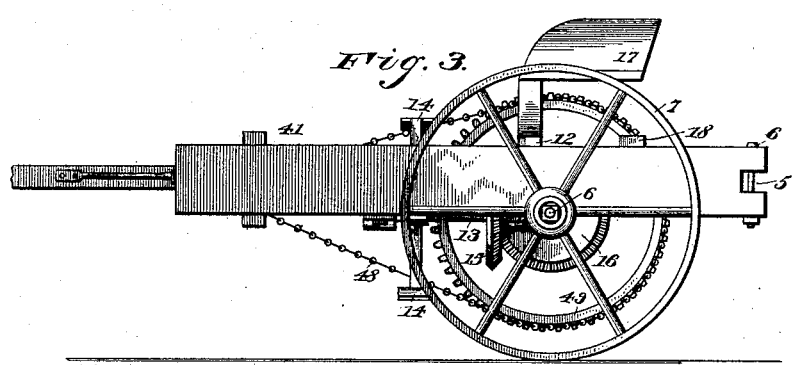
Figure 4:
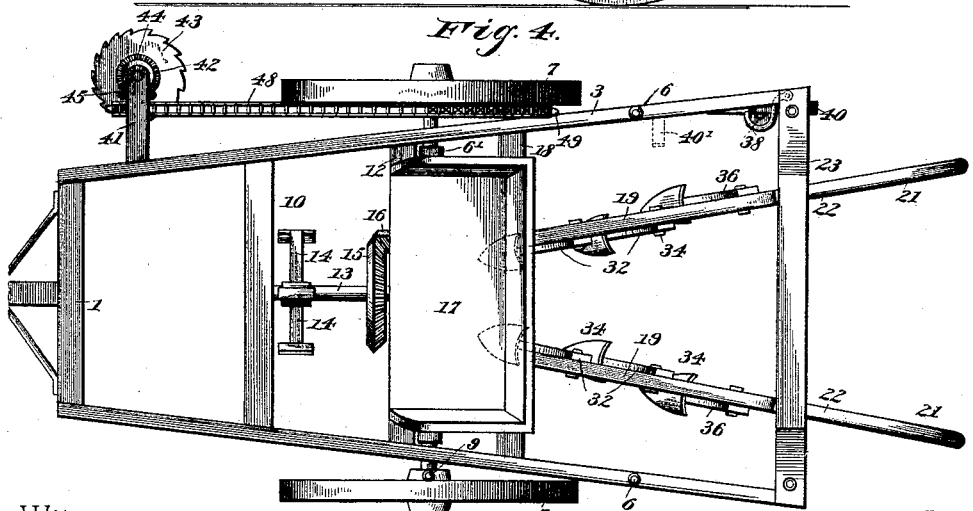

Referring to the drawings, Figure 1 is a perspective of an agricultural machine constructed in accordance with my invention, the same being in condition for planting cotton. Fig. 2 is a longitudinal section of the same. Fig. 3 is a side elevation, the machine being converted to a road-cart. Fig. 4 is a plan, the machine being shown as for use as an ordinary cultivator and chopper.

Like numerals of reference indicate like parts in all the figures of the drawings.

In constructing the framework I employ a front cross-bar 1 and a rear cross-bar 2, the same being connected by opposite side bars 3, converged toward their front ends and provided upon their under sides with bearings 4. The side bars 3 are formed in two sections, the adjacent ends of which are tenoned and mortised, as at 5, and connected by a bolt 6, so that, as will be readily seen, the rear sections of the side bars, together with such mechanism as will be hereinafter described as being connected therewith, may be removed, leaving only such other mechanism as will be hereinafter described as supported by the front portion of the framework. An axle 6' is journaled in bearings 4, the axle being designed for rotation under certain circumstances and being provided beyond the side bars with ground-wheels 7, mounted loosely thereon. The hubs of the ground-wheels are provided with perforations 8, and similar perforations are likewise formed in the axle, so that through the medium of bolts or pins 9 the hubs and axle may be locked together and movement of the wheels will be transferred to the axle.

In a pair of transverse bars 10 and 12, located in front of and above the axle, there is journaled a rotatable chopping-shaft 13, carrying radial choppers or hoes 14 and a beveled gear 15. This gear has its teeth engaged with a master-gear 16, mounted upon the axle 6' and designed to move with the axle when the latter revolves, so that motion is imparted from the axle to the chopping-shaft and the hoes are thus revolved for thinning out cotton in the ordinary way. When the hoes are to be used, the ground-wheels are made fast to the axle, so that the two move in unison.

Mounted removably upon the cross-bar 12 is a seat 17 for the driver, or the same may be used as a seat for an ordinary road-cart, into which the machine may be converted by simply removing the pins 9 from the hubs and the rear portion of the framework, heretofore described as being removable. A cross-bar 18 connects the two side bars 3, and to the same there is loosely connected a pair of plow-beams 19. These plow-beams are loosely connected by bolts 20 to the cross-bar 18, so that they are capable of lateral and to a limited extent rotatable movement. The rear ends of the beams 19 are shaped to form suitable handles 21, and in front of the same are rounded, as at 22, to rest upon the rear transverse bar 2 of the framework. A keeper-bar 23 is connected to the rear bar 2 and spans the handles, so that the same are left loose to move in or out or turn rotatably to a certain extent, and thus turn in or out standards which the beams are designed to carry.

Removably connected to the rear cross-bar 2 is a pair of inverted-L-shaped hangers 23, and the same are provided at their lower ends with bearings for the reception of a transverse shaft 24, fixedly mounted therein and provided with agitators 25. Upon this shaft and inclosing the agitators is a hollow rotatable hopper 26, provided with one or more seed-openings 27, which may be covered or closed by slides 28. Removably connected to the cross-bar 2 immediately above the hopper and depending from the same is furrow-opener 29, and likewise connected by the same bolt 30 and depending in rear of the hopper is a coverer or furrow closer 31. These parts are only employed when the machine is used as a cotton-planter, and when used as a chopper are designed to be removed.

32 designates a series of two standards, which are inclined and adjustably connected by bolts 34 to the inner sides of each of the beams 19. To these are connected turn-plows 34', which are in this instance of triangular shape and provided at their outer or landsides near their points with small rotatable disks or colters 35. In rear of these standards a third standard 36 is connected to each of the beams 19, and they carry ordinary sweeps 37, which aid the furrow coverers or closers in reforming the bed or bedding up after the cotton has been dropped.

When the machine is used as an ordinary cultivator, the form of plows are changed and ordinary shovels are substituted therefor.

At the rear right-hand corner of the frame there is pivoted, as at 38, a caster-shank 39, in which is mounted a wheel 40. This wheel may be lowered to a vertical position for supporting the rear end of the framework when the plows are not used, as in traveling to and from the field, or may be elevated and supported by a hook 40', whereby the plows are lowered to their operative positions.

A pair of arms 41, projecting from the front right-hand corner of the machine, may be employed, the same forming bearings for a vertical shaft 42, adapted to be rotated and carrying a circular saw 43 for cutting stalks. Upon the shaft is mounted a gear 44, and the same is engaged and driven by a gear 45, mounted on a stud-shaft 46, extending from the frame and carrying a sprocket 47, which is engaged by a chain 48, receiving motion from a master-sprocket 49, secured to one of the ground-wheels.

From the foregoing description, in connection with the accompanying drawings, it will be seen that I have provided a machine adapted to be changed from an ordinary cotton-chopper to a cotton-planter, from thence to a cornstalk-cutter, and finally to a road-cart for ordinary country use, and that I accomplish the same in a cheap and simple manner, saving the expense of providing these machines separately.

Having described my invention, what I claim is—

1. In a machine of the class described, the combination, with the rectangular framework the opposite sides of which are made sectional and detachably connected, of an axle supporting the front section, ground-wheels for the same, plow-carrying standards supported by the rear detachable portions of the frame, and a seat carried by the stationary portion of the frame, substantially as specified.

2. In a machine of the class described, the combination, with the rectangular plow-carrying frame, the axle located in front of the plows and having ground-wheels, of the caster shank and wheel, the former being pivoted to the rear corner of the frame and adapted when lowered to raise the plows from the ground, and the hooks for removably engaging the shank when turned up and pivoted to the side and end of the frame, substantially as specified.

3. In a machine of the class described, the combination, with the rectangular frame and the intermediate cross-bar, of the axle and wheels, the pair of beams terminating at their rear ends in handles beyond the rear cross-bar of the frame, having their front ends pivoted to the intermediate cross-bar, the transverse keeper-bar mounted on the rear cross-bar and loosely spanning the beams, and the standards depending from the beams, substantially as specified.

4. In a machine of the class described, the combination, with the oblong framework comprising the front and rear cross-bars, the longitudinal plow-beams connected to and mounted upon the bars and carrying depending plow-standards, of the inverted-L-shaped hangers depending from the rear cross-bar, the transverse shaft mounted therein and carrying agitators, the cylindrical hopper mounted for rotation upon the shaft and having seed-openings, and front and rear standards removably connected to the rear bar above the hopper, the front standard terminating in a furrow-opening point and the rear standard in a furrow-closing end, substantially as specified.

5. In a machine of the class described, the combination, with the oblong framework the opposite side bars of which are formed in front and rear sections detachably connected and the seat supported by the framework for the accommodation of the driver, of the axle loosely supporting the framework and provided with perforations, the wheels loosely mounted on the axle and having their hubs provided with perforations agreeing with those of the axle, pins for inserting through the hub and into the axle, rotatable chopping mechanism, and gears connecting the same with the axle, substantially as specified.

In testimony that I claim the foregoing as my own I have hereto affixed my signature in the presence of two witnesses.

JOHN BIRD WILKINS.

Witnesses:
SAMUEL STATEN,
JOHN C. STATEN.